(12) United States Patent
Arima et al.

(10) Patent No.: US 6,832,079 B2
(45) Date of Patent: Dec. 14, 2004

(54) RADIO RECEIVING APPARATUS, AND METHOD FOR DETECTING A DELAY DIFFERENTIAL BETWEEN BRANCHES IN THE APPARATUS

(75) Inventors: Takenobu Arima, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 378 days.

(21) Appl. No.: 10/148,268
(22) PCT Filed: Sep. 28, 2001
(86) PCT No.: PCT/JP01/08501

§ 371 (c)(1),
(2), (4) Date: May 29, 2002

(87) PCT Pub. No.: WO02/30006
PCT Pub. Date: Apr. 11, 2002

(65) Prior Publication Data
US 2002/0183096 A1 Dec. 5, 2002

(30) Foreign Application Priority Data
Sep. 29, 2000 (JP) ........................................ 2000-300916

(51) Int. Cl.[7] ................................................ H04B 1/06
(52) U.S. Cl. ..................... 455/276.1; 370/342; 375/148
(58) Field of Search ............................... 455/272, 276.1, 455/65, 504, 506; 370/335, 342; 375/147, 148, 150

(56) References Cited

U.S. PATENT DOCUMENTS 6,229,842 B1 * 5/2001 Schulist et al. ............. 375/148
6,768,729 B1 * 7/2004 Ohsuge ...................... 370/342

FOREIGN PATENT DOCUMENTS

| JP | 224627 | 2/1990 |
| JP | 04040714 | 2/1992 |
| JP | 08008634 | 1/1996 |

OTHER PUBLICATIONS

A. Aoyama, et al., "CDMA Path–Search Sheme Using Combined Delay Profile of Diversity Antennas", Technical Report of IEICE, C & C Media Research Labs., NEC Corporation, ppgs. 25–30, Jul. 1999.

* cited by examiner

Primary Examiner—Lee Nguyen
(74) Attorney, Agent, or Firm—Stevens, Davis, Miller & Mosher, LLP

(57) ABSTRACT

Delay profiles of respective branch received signals received through a plurality of antennas are formed; peaks on each of formed delay profile signals are detected; the maximum peaks are obtained among detected peaks on the respective delay profile signals; and average delay differentials between the delay profiles are obtained by averaging a desired number of delay differentials among the maximum peaks.

16 Claims, 8 Drawing Sheets

US 6,832,079 B2

RADIO RECEIVING APPARATUS, AND METHOD FOR DETECTING A DELAY DIFFERENTIAL BETWEEN BRANCHES IN THE APPARATUS

This application is a 371 of PCT/JP01/08501 filed on Sep. 28, 2001.

TECHNICAL FIELD

The present invention relates to a radio receiving apparatus for demodulating by using a plurality of received signals obtained with a plurality of antennas, and a method for detecting a delay differential between branches in the apparatus.

BACKGROUND ART

A method, in which delay profiles are formed for respective received signals obtained through each antenna in a radio receiving apparatus using a plurality of antennas and are combined is known to be effective for searching paths (see Radio Communication Systems (RCS), the Institute of Electronics, Information, and Communication Engineers (IEICE), Report 99-67, July, 1999).

However, there are cases where delay periods from antennas to receiving baseband processing means vary depending on received signals of each antenna (hereinafter called branch received signals). One of the main reasons for this is the variety in the delay characteristics of receiving filters. Cases like above might render the delay profile combination less effective and might even lead to deterioration. Similarly, in a radio receiving apparatus comprising an array antenna, an apparatus for forming delay profiles using signals combining each branch received signal has a similar problem.

Conventionally, one method for detecting delay differentials between individual branch received signals is to measure on a per path basis the processing times of the filters arranged directly behind antennas and delay periods caused by the resistance on the signal lines between antennas and the baseband processing means and thus obtain the delay differentials.

A second method is to measure on a per path basis the delay period from the point a reference signal is input from an antenna to a radio receiving apparatus to the point this signal reaches a baseband processing means, input a reference signal from the antenna to the radio receiving apparatus, and thus obtain differential delays.

However, in a conventional apparatus, a problem with the first method is that the method requires a number of steps to measure and adjust the processing times of the filters and delay periods on signal lines on each path between an antenna and baseband processing means.

With respect to the second method, there is a possibility that a reference signal becomes an interference source, as the reference signal, which is not required for ordinary transmission and receiving, is input, and it is required that delay periods on respective paths between the antenna and baseband processing means are measured, and adjusted. Another problem is that an ordinary received signal may not be received there between.

DISCLOSURE OF INVENTION

The object of the present invention is to detect delay differentials of respective branch received signals between a plurality of antennas and baseband processing means in an easy and accurate manner.

The object is achieved as follows: delay profiles of respective branch received signals received through a plurality of antennas are formed; peaks in each of formed delay profile signals are detected; the maximum peaks are obtained from among the detected peaks in the respective delay profile signals; and average delay differentials between the delay profiles are obtained by averaging out a desired number of delay differentials among the maximum peaks.

BEST MODE FOR CARRYING OUT THE INVENTION

Hereinafter, embodiments of the present invention will be described in detail, referring to attached drawings.

(Embodiment 1)

Figure 1:
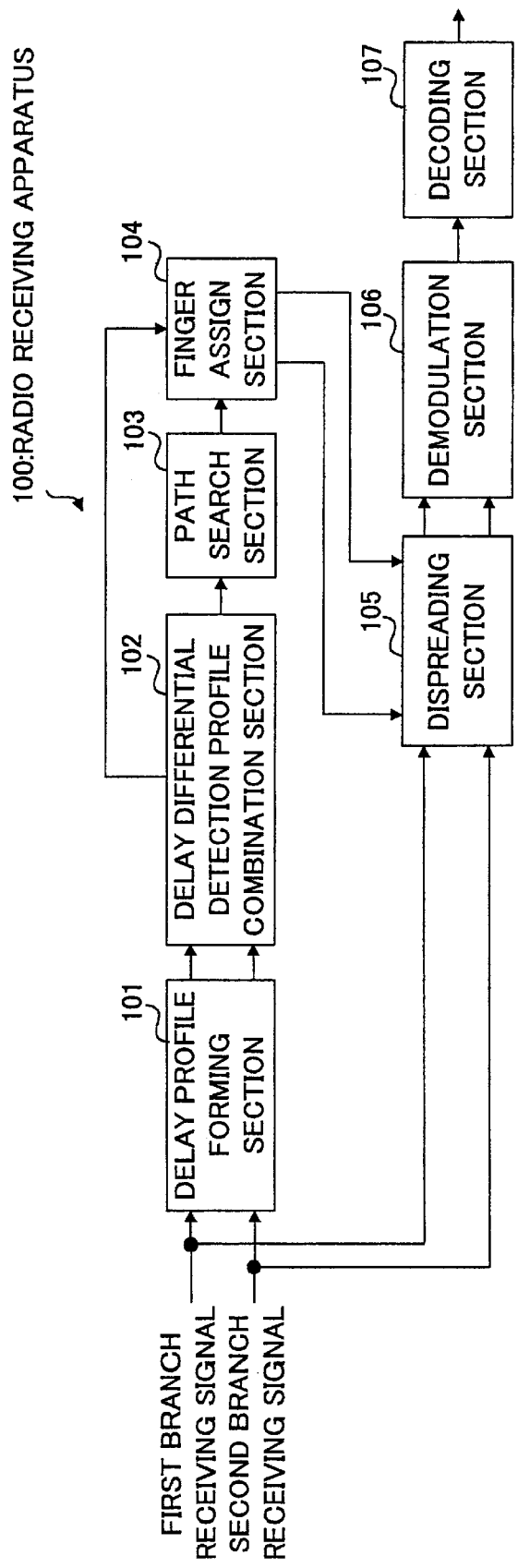
FIG. 1 is a block diagram showing a configuration of a radio receiving apparatus according to an embodiment 1 of the present invention.

FIG. 1 is a block diagram showing a configuration of a radio receiving apparatus according to embodiment 1 of the present invention.

A radio receiving apparatus 100, shown in FIG. 1, which is configured as a diversity antenna or an array antenna, and in which delay differentials on a plurality of paths between each antenna and baseband processing means are detected and corrected, comprising: a delay profile forming section 101; a delay differential detection profile combination section 102; a path search section 103; a finger assign section 104; a despreading section 105; a demodulation section 106; and a decoding section 107.

The components 101–107 are arranged at the input side in the baseband processing means, and the delay profile forming section 101 is connected to the back of an analog-digital converter in which analog received signals, which arrive through filters after they are received through two not-shown antennas, of a first and a second branches are converted into digital signals.

Figure 2:
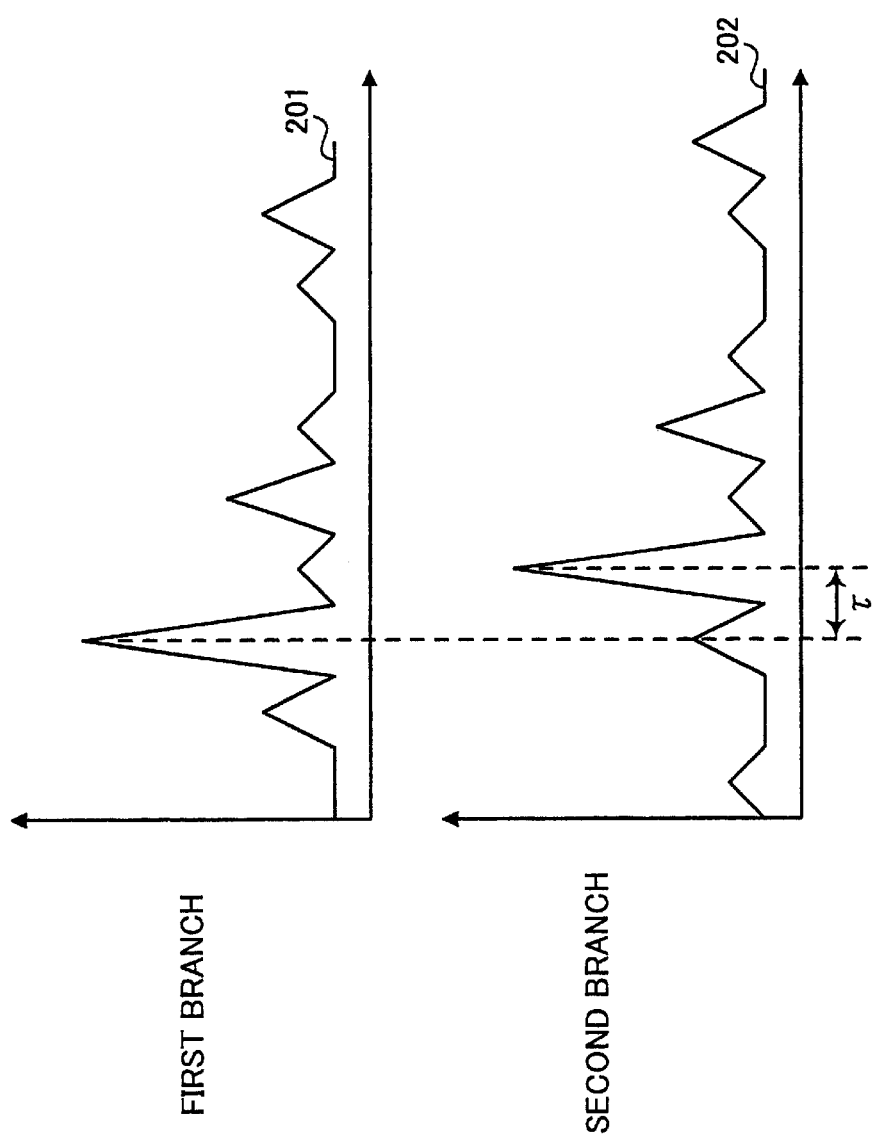
FIG. 2 shows waveforms of delay profile signals, formed in a delay profile forming section of the radio receiving apparatus according to embodiment 1, for the first and second branches.

The delay profile forming section 101 forms delay profiles shown in FIG. 2 by correlating the first and second branch received signals with known signals. FIG. 2 shows signal waveforms of the delay profiles for the first and second branches.

In FIG. 2, 201 is a first branch delay profile signal (hereinafter, called a first delay profile signal), and 202 is a second branch delay profile signal (hereinafter, called a second delay profile signal).

Figure 3:
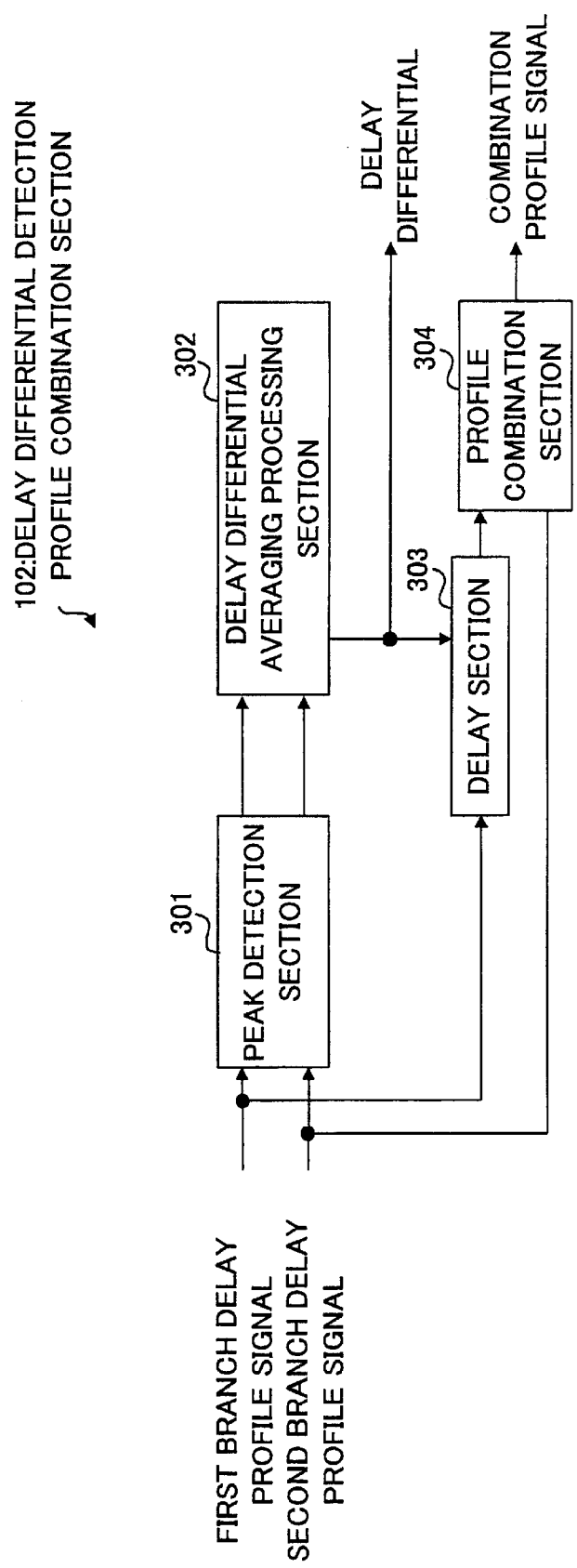
FIG. 3 is a block diagram showing a configuration of a delay differential detection profile combination section in the radio receiving apparatus according to embodiment 1.

The delay differential detection profile combination section 102 detects a delay differential between the first and the second delay profile signals formed in the delay profile forming section 101; at the same time, forms a combination delay profile signal combining the first and the second delay profile signals; and has a configuration shown in FIG. 3.

That is, the delay differential detection profile combination section 102 comprises, as shown in FIG. 3: a peak detection section 301; a delay differential averaging processing section 302; a delay section 303; and a profile combination section 304.

The peak detection section 301 detects peaks on the first and the second delay profile signals 201, 202, which are shown in FIG. 2, and outputs the detected peaks to the delay differential averaging processing section 302.

The delay differential averaging processing section 302 obtains every measurement period a desired number of delay differentials. between the maximum peaks on the first and the second delay profile signals 201, 202 which are shown in FIG. 2, and the delay differentials are obtained by averaging the obtained delay differentials. The delay differentials are output to the delay section 303 and the finger assign section 104.

The delay section 303 delays the first delay profile signal according to the delay differential obtained in the delay differential averaging processing section 302 so that the first delay profile signal has the same phase as that of the second delay profile signal, and outputs the delayed signal to the profile combination section 304.

The profile combination section 304 combines the first and the second delay profile signals which have the same phase, and outputs the obtained combination delay profile signal obtained above to the path search section 103.

The path search section 103 detects the phase of a peak from the combination delay profile signal, and outputs it to the finger assign section 104.

The finger assign section 104 recognizes the delay differential between the first and the second branch received signals input to the despreading section 105, using the delay differential input from the delay differential detection profile combination section 102, and indicates timing, by which the peak phase from the path search section 103 is shifted by the delay differential, to the despreading section 105 as despreading timing of the first and the second branch received signals.

The despreading section 105 despreads the first and second branch received signals at the indicated despreading timing. The despreading signal obtained above is demodulated in the demodulation section 106, and, subsequently, is decoded in the decoding section 107 together with the rake combination.

As described above, the radio receiving apparatus 100 of embodiment 1 has been configured that delay profiles of the first and the second branch received signals received through each antenna are formed in the delay profile forming section 101, peaks in the first and second delay profile signals are detected in the peak detection section 301, the maximum peaks are obtained among the peaks in the first and the second delay profile signals in the delay differential averaging processing section 302, respectively, and the delay differentials are obtained by averaging a desired number of delay differentials with regard to the obtained maximum peaks.

Thereby, the delay differentials between each branches received signal from a plurality of antennas to the baseband processing means may be easily and accurately detected.

Moreover, it is configured such that each delay profile signal has the same phase in the delay section 303 by delaying according to the delay differential a delay profile signal with a phase lead of the first or the second delay profile signal, and the delay profile signals which have the same phase are combined in the profile combination section 304.

Thereby, combination delay profiles on which actual paths are favorably reflected may be obtained, as the combination delay profiles may be formed, using the delay profiles without the delay differential between the branches.

It has been also configured that the peak phase is detected from the combination delay profile signal in the path search section 103, and timing by which the peak phase is shifted by the above-described delay differential in the finger assign section 104 is set for the despreading timing of the first and the second branch received signals.

Thereby, the size of a circuit for correcting the delay differential is not required to be increased, as the delay differential between the branches is corrected by the timing of the despreading.

(Embodiment 2)

Figure 4:
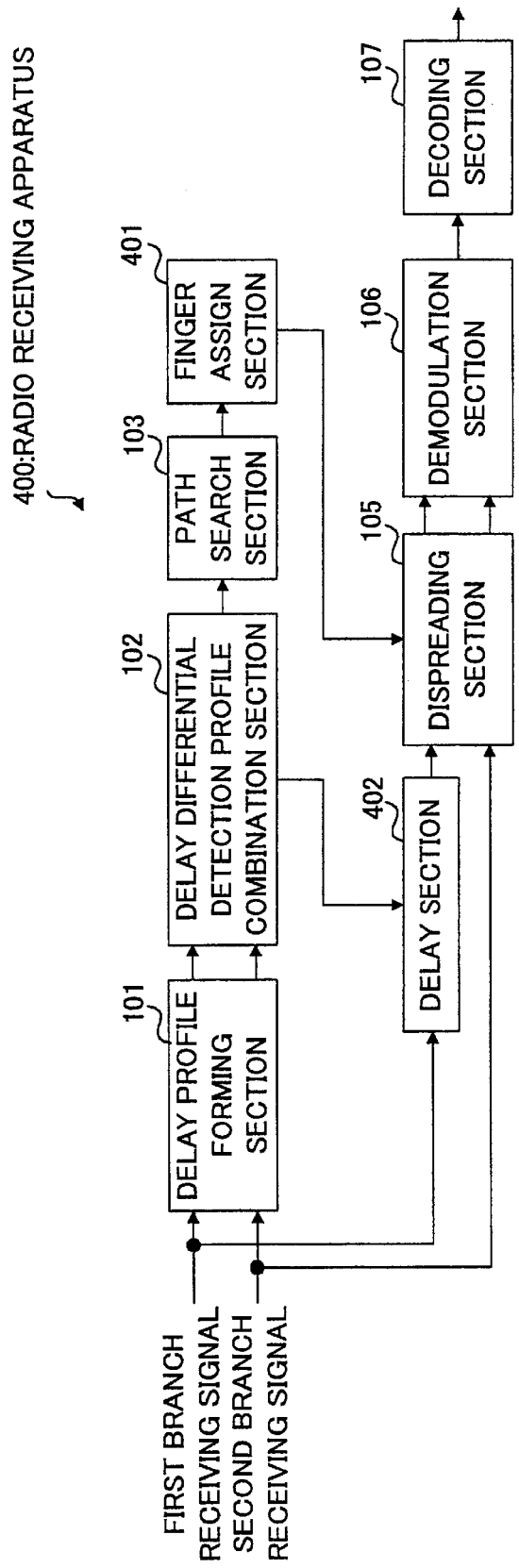
FIG. 4 is a block diagram showing a configuration of a radio receiving apparatus according to embodiment 2 of the present invention.

FIG. 4 is a block diagram showing a configuration of a radio receiving apparatus according to embodiment 2 of the present invention. Here, in embodiment 2 shown in FIG. 4, parts corresponding to those of an embodiment 1 in FIG. 1 are denoted by the same reference numbers as those in FIG. 1, and the description will be eliminated.

A radio receiving apparatus 400 shown in FIG. 4 comprises: a finger assign section 401; and a delay section 402; as well as a delay profile forming section 101; a delay differential detection profile combination section 102; a path search section 103; a despreading section 105; a demodulation section 106; and a decoding section 107, which are components in embodiment 1.

In the above configuration, the delay section 402 delays a first branch received signal according to a delay differential output from the delay differential detection profile combination section 102 so that the first branch received signal has the same phase as that of the second branch received signal, and outputs the delayed signal to the despreading section 105.

The finger assign section 401 indicates a peak phase from the path search section 103 to the despreading section 105 as despreading timing of the first and the second branch received signals.

Thus, it is configured in the radio receiving apparatus 400 according to embodiment 2 that the first and the second branch received signals have the same phase by delaying according to the delay differential a branch received signal with a phase lead of the first or the second branch received signal in the delay section 402.

Thereby, the delay differentials of respective branch received signals received through the first and the second antennas and input to the despreading section 105 may be easily corrected.

(Embodiment 3)

Figure 5:
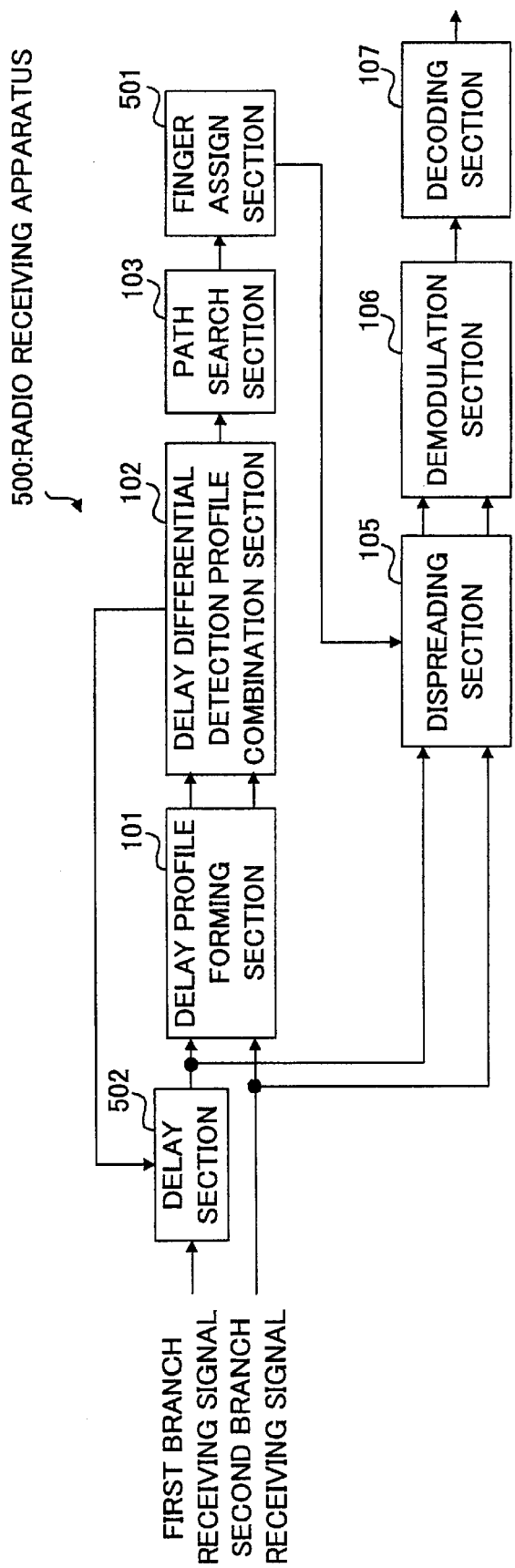
FIG. 5 is a block diagram showing a configuration of a radio receiving apparatus according to embodiment 3 of the present invention.

FIG. 5 is a block diagram showing a configuration of a radio receiving apparatus according to embodiment 3 of the present invention. Here, in embodiment 3 shown in FIG. 5, parts corresponding to those of an embodiment 1 in FIG. 1 are denoted by the same reference numbers as those in FIG. 1, and the description will be eliminated.

A radio receiving apparatus 500 shown in FIG. 5 comprises: a finger assign section 501; and a delay section 502; as well as a delay profile forming section 101; a delay differential detection profile combination section 102; a path search section 103; a despreading section 105; a demodulation section 106; and a decoding section 107, which are components in embodiment 1. However, the delay differential detection profile combination section 102 in embodiment 3 has a configuration without a delay section 303.

In the above configuration, the delay section 502 delays a first branch received signal, which is input to the delay profile forming section 101, and the despreading section 105, according to a delay differential output from the delay differential detection profile combination section 102 so that the first branch received signal has the same phase as that of the second branch received signal.

The finger assign section 501 indicates a peak phase from the path search section 103 to the despreading section 105 as despreading timing of the first and the second branch received signals.

Thus, it is configured in the radio receiving apparatus 500 according to embodiment 3 that the first and the second branch received signals have the same phase in the delay section 502 by delaying, according to the delay differential from the delay differential detection profile combination section 102, a branch received signal, which has a phase lead, of the first or the second branch received signal input to the delay profile forming section 101.

Thereby, combination delay profiles on which actual paths are favorably reflected by correcting the delay differentials of respective branch received signals may be obtained, as feed back control of amounts of delay for the first and the second branch received signals by the delay section 502 is performed based on an average delay differential, which is obtained in the delay profile combination section 102, between the delay profiles.

Besides, it may be configured in the delay differential detection profile combination section 102 which is a component in the above-described embodiments 1–3 that there is set a window defining a range by which paths are identified as the same when a peak is detected on the first and the second delay profile signals in a peak detection section 301, and peaks of the first and the second delay profile signals which pass through the window are output to a delay differential averaging processing section 302.

Figure 6:
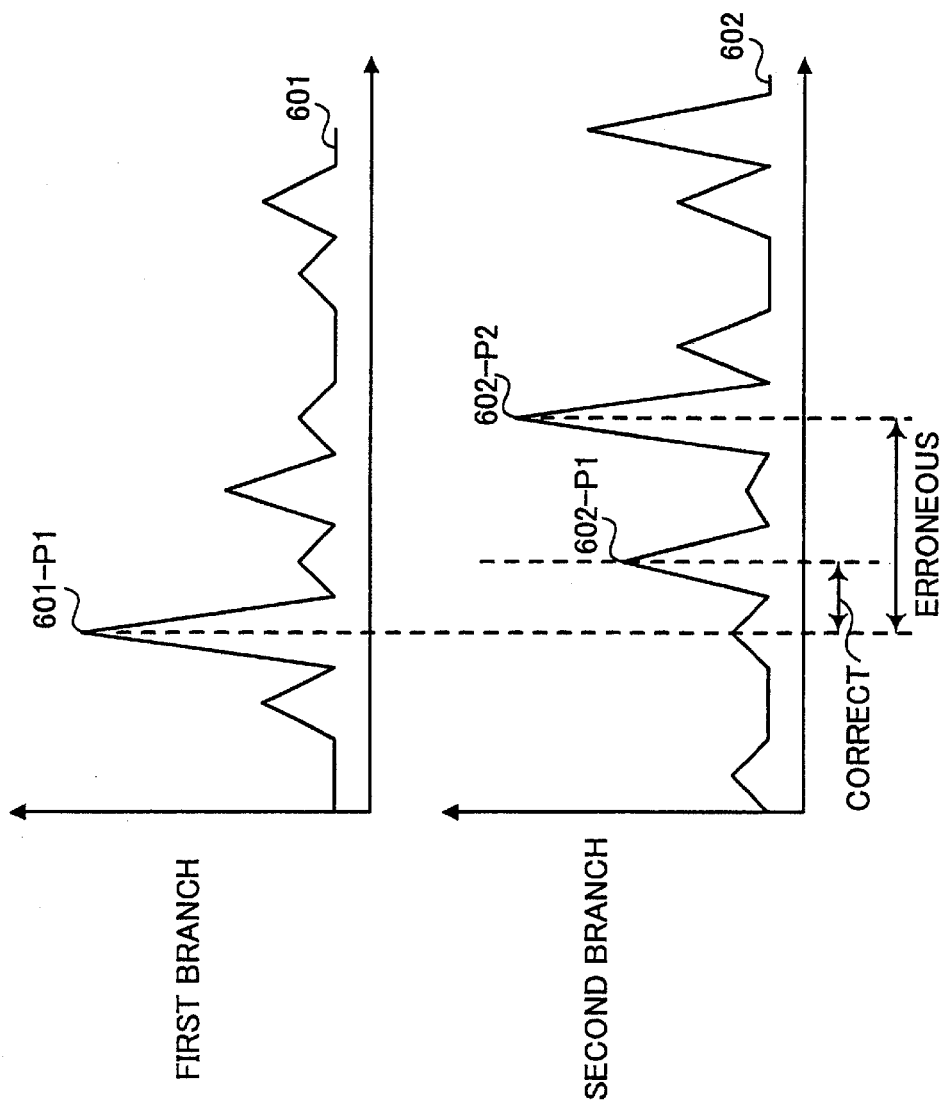
FIG. 6 shows other waveforms of delay profile signals formed in the delay profile forming section of the radio receiving apparatus according to any one of embodiments 1–3, for the first and second branches.

In this case, the following advantages may be obtained. It is assumed that the first branch delay profile signal 601 and the second branch delay profile signal 602, waveforms of which are shown in FIG. 6, are formed in the delay profile forming section 101, and are output to the peak detection section 301.

In this case, it is assumed that a peak of the second delay profile signal 602 is 602-P1, corresponding to a peak 601-P1 of the first delay profile signal 601. However, there is a possibility that a peak 602-P2 is judged as the peak corresponding to the peak 601-P1 by mistake in the delay differential averaging processing section 302, as the peak 602-P2 away from the peak 602-P1 is larger in amplitude.

Then, erroneous averaging processing in which a not-target peak is used may be eliminated by detecting peaks after setting in the peak detection section 301 a window with a range by which only 602-P1 corresponding to 601-P1 passes through it, when the amplitude of the not-target peak away from a target peak is larger in the other delay profile signal. Therefore, the total time for obtaining the delay differentials by the averaging processing may be shortened.

Moreover, it may be configured that, in the delay differential averaging processing section 302, the delay differential may be obtained not by averaging processing in which only the maximum peaks are used as described above, but by averaging processing using Nth peaks such as the second peaks, and the third peaks. In this case, the total time for obtaining the delay differentials may be also shortened.

In addition, it may be configured that cross correlation of delay profiles between branches is calculated, using the delay profiles in a section where there are the upper N number of peaks, and the amount of shift (time) of the delay profile by which the maximum peak appear may be the delay differential between both branches. In this case, the total time for obtaining the delay differentials may be shortened, too.

Figure 7:
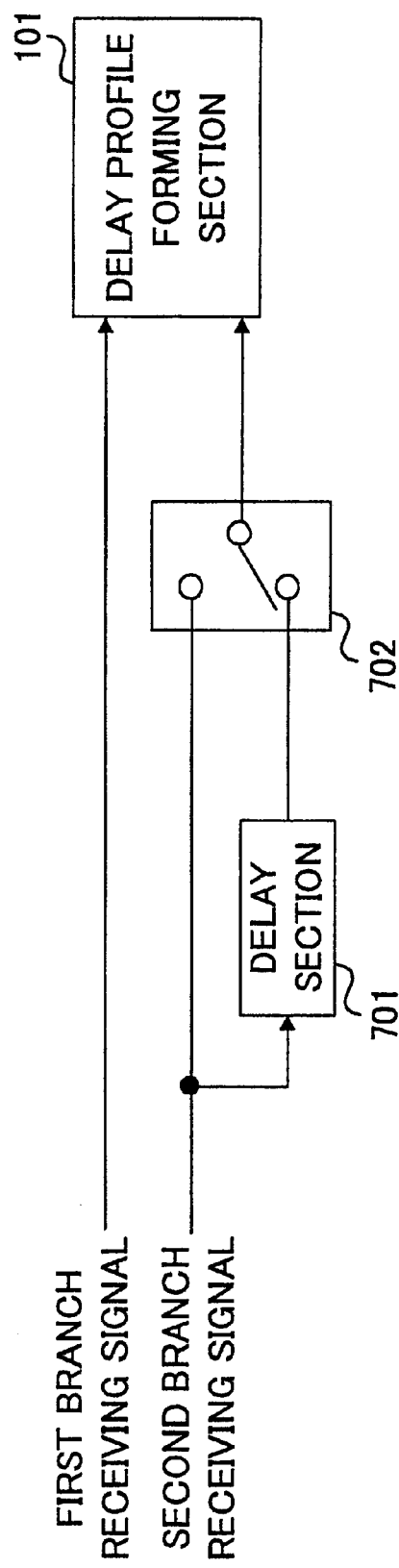
FIG. 7 is a block diagram showing characteristics of another configuration of the radio receiving apparatus according to any one of embodiments 1–3.

Furthermore, a delay section 701 and a changeover switch 702 are provided, as shown in FIG. 7, on either of branches (here, the second branch) which are connected to the input side of the delay profile forming section 101. Here, the amount of delay in the delay section 701 is configured to be smaller than a sampling interval of the delay profile.

The changeover switch 702 is switched to the side of the delay section 701 and the other non-delay side. At this time, the following processing is performed in the delay differential averaging processing section 302: A peak of the second delay profile signal formed by the side of the delay section 701, a difference between the above peak and a peak of the first delay profile signal corresponding to the above peak, and information on the amplitude of the peak of the second delay profile signal at this time are stored.

Similarly, a peak of the second delay profile signal formed by the non-delay side, a difference between the above peak and a peak of the first delay profile signal corresponding to the above peak, and information on the amplitude of the peak of the second delay profile signal at this time are stored.

Then, averaging processing adopting a difference corresponding to the information on the larger amplitude is performed, and the delay differential is obtained.

Figure 8A:
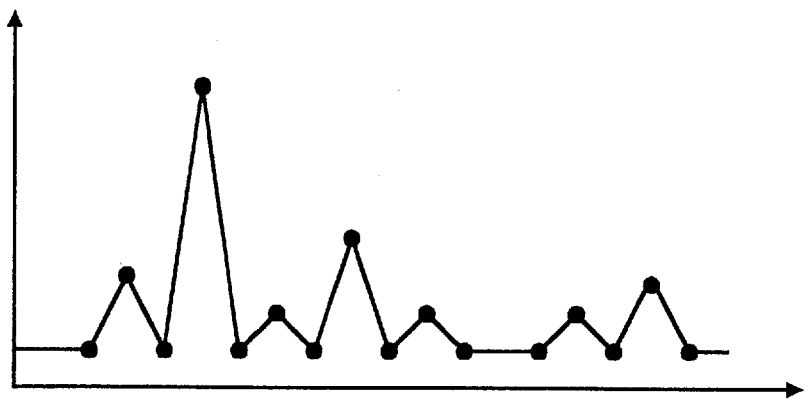
FIG. 8A shows a waveform that describes one of the effects of application examples according to embodiments 1–3.
Figure 8B:
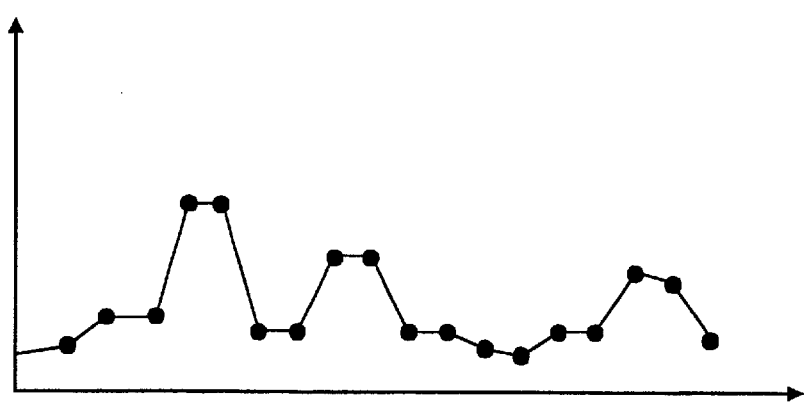
FIG. 8B shows a waveform that describes another effect of application examples according to embodiments 1–3.
Figure 8C:
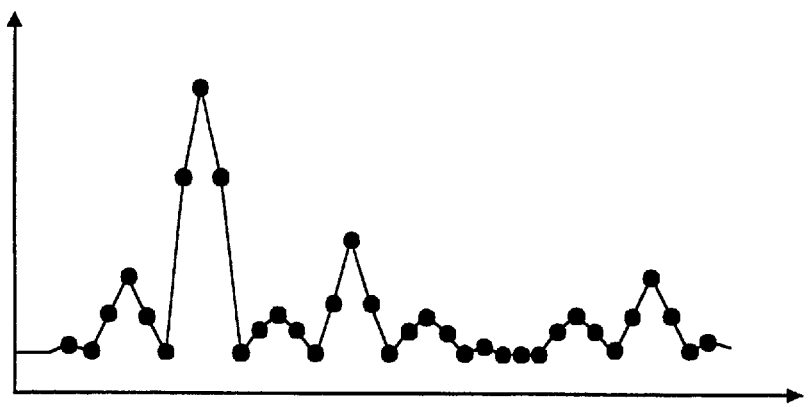
FIG. 8C shows a waveform that describes a still another effect of application examples according to embodiments 1–3.

Thereby, the delay differential can be obtained at shorter intervals than the sampling intervals of the delay profile, when the amount of delay at delay is set as shorter intervals than the sampling intervals of the delay profile. For example, a waveform with shorter intervals, as shown in FIG. 8C, in which waveforms in FIG. 8A, and FIG. 8B are combined can be obtained as shown in FIG. 8A–FIG. 8C.

Though, cases where timing, by which peak phases are shifted by the amount of the average delay differential corresponding to each branch, is set for despreading timing of respective branch received signals have been described in the above-described embodiments, the present invention is not limited to the above-described embodiments, and the above timing may be used as demodulating timing of the demodulation section.

In addition, the present invention is not limited to the above-described embodiments, and various variations and modifications may be possible.

The radio receiving apparatus according to the present invention employs a configuration that comprises, delay profile forming means that forms a delay profile for each of individual branch received signals received by a plurality of antennas, peak detection means that detects a peak in each delay profile signal formed by said delay profile forming means, and delay differential averaging processing means that obtains a maximum peak in each delay profile signal from among the peaks detected by said peak detection means and that obtains an average delay differential among individual delay profiles by averaging out a desired number of delay differentials between the maximum peaks.

With this configuration it is made possible to detect with simplicity and accuracy a delay differential that develops between received signals under individual branches in the course between a plurality of antennas and baseband processing means.

The radio receiving apparatus according to the present invention employs a configuration that further comprises, delay means that delays a delay profile signal with a leading phase from among individual delay profiles by an average delay differential among the individual delay profiles, and adjusts the phases of individual profile signals the same, and profile combining means that combines the delay profile signals of the same phase.

With this configuration it is made possible to correct an inter-branch delay differential with simplicity. It is also possible, since corrected delay profiles are combined, to obtain a combined delay profile that favorably reflects an actual path.

The radio receiving apparatus according to the present invention employs a configuration that further comprises, path search means that detects a peak phase from a combined delay profile obtained by the combination by said profile combining means, and reception timing determining means that sets a timing obtained by shifting a peak phase by an average delay differential under a corresponding branch for a decoding timing for a branch received signal.

With this configuration, the paths on which actual paths are favorably reflected may be accurately detected in the path search means, as the peak phases are detected based on the combination delay profiles on which actual paths are favorably reflected. And demodulation operation may be realized in a state in which the paths are under accurate synchronization with incoming timing, as the peak phases which have been accurately detected are shifted by the corresponding average delay differential, and are set for the receiving timing in the receiving timing decision means.

The radio receiving apparatus according to the present invention employs a configuration, wherein, when a branch received signal is a spread signal, said reception timing determining means sets a timing obtained by shifting a peak phase by an average delay differential under a corresponding branch for a dispreading timing for a branch received signal.

With this configuration it is made possible to correct with simplicity a differential delay between branches at the timing of dispreading.

The radio receiving apparatus according to the present invention employs a configuration that comprises, delay profile forming means that forms a delay profile for each of individual branch received signals received by a plurality of antennas, delay differential detecting profile combining means that obtains a maximum peak in each delay profile signal from among the peaks in a delay profile signal formed by said delay profile forming means, that obtains an average delay differential among individual delay profiles by averaging out a desired number of delay differentials between the maximum peaks, and that delays a leading delay profile signal with a leading phase from among individual delay profile signals by an average delay differential among individual delay profiles and combines the phases of individual profile signals the same, path search means that detects a peak phase from a combined delay profile signal obtained by the combination in said delay differential detecting profile combining means, finger assign means that sets the peak phase a decoding timing for a branch received signal, and delay means that delays a leading delay profile signal from among individual branch received signals decoded by the decoding timing by an delay differential, and adjusts the phases of individual delay profile signals the same.

With this configuration it is made possible to correct with simplicity and accuracy a delay differential between branch received signals received by a plurality of antennas.

The radio receiving apparatus according to the present invention employs a configuration that comprises, delay means that delays each of branch received signals received by a plurality of antennas by a phase corresponding to each branch and adjusts individual branch received signals to the same phase, delay profile forming means that forms a delay profile for each of individual branch received signals output from said delay means, and delay differential detecting profile combining means that obtains a maximum peak for each delay profile signal from among the peaks in a delay profile signal formed by said delay profile forming means, and that obtains an average delay differential among individual delay profiles by averaging out a desired number of delay differentials between the maximum peaks and combines individual delay profile signals, said delay means, in accordance with delay differentials between delay profiles, delaying a branch received signal with a leading phase by an average delay differential and adjusting the phases of individual branch received signals the same.

With this configuration it is made possible to form a combined delay profile that favorably reflects an actual path by correcting a delay differential for each branch received signal, since the delay volume by delay means for each branch received signal is controlled by feedback-control based on the average delay differentials between the delay profiles obtained by delay profile combining means.

The radio receiving signal according to the present invention employs a configuration that comprises, path search means that detects a peak phase from a combined delay profile obtained by the combination by said profile combining means, and finger assign means that sets the peak phase a decoding timing for an branch received signal.

With this configuration it is made possible to obtain with accuracy a decoding timing for each of individual branch received signals received by a plurality of antennas.

The radio receiving apparatus according to the present invention employs a configuration, wherein a range judged to be of the same path is defined at the time of a peak detection of a delay profile signal and the peak detection is performed within this range.

With this configuration and by thus defining a range where only the peaks of other profile signals corresponding to the peaks of a certain profile signal enter, and performing peak detection therein, it is made possible to reduce the likelihood to erroneously perform averaging processing on these other delay profile signals with differing peaks, when a peak with a phase more distant than the a targeted peak is larger in amplitude. By this means, the total time to obtain a delay differential through averaging processing may be shortened.

The radio receiving apparatus according to the present invention employs a configuration, wherein a delay differential is obtained through averaging processing using the upper peaks to Nth.

With this configuration it is made possible to increase the number of samples of average delay periods and to thus shorten the total time for obtaining a delay differential.

The radio receiving apparatus according to the present invention employs a configuration that comprises, delay means that delays a branch received signal and switching means that switches delay and non-delay and outputs the switching to delay profile forming means, and wherein, when averaging processing of delay differentials is performed, a peak in a delay profile signal formed during a delay period, a phase differential with a corresponding peak in a delay profile signal under a different branch, and amplitude data of a peak in a delay profile signal formed during this delay period, and also a peak in a delay profile signal formed during a non-delay period, a phase differential with a corresponding peak in a delay profile signal under a different branch, and amplitude data of a peak in a delay profile signal formed during this non-delay period, are memorized, and a delay differential is obtained by employing a phase differential corresponding to one of the above two sets with larger amplitude data and performing averaging processing therewith.

With this configuration it is made possible to obtain a delay differential at intervals shorter than the sampling intervals of a delay profile by setting the delay volume by the delay means with intervals shorter than the sampling intervals of a delay profile.

The present invention is a mobile station apparatus that has a radio receiving apparatus, and the radio receiving apparatus comprises, delay profile forming means that forms a delay profile for each of individual branch received signals received by a plurality of antennas, peak detection means that detects a peak in each delay profile signal formed by said delay profile forming means, and delay differential averaging processing means that obtains a maximum peak for each delay profile signal from among the peaks detected by said peak detection means and that obtains an average delay differential among individual delay profiles by averaging out a desired number of delay differentials between the maximum peaks.

With this configuration, using a mobile station apparatus, it is made possible to detect with simplicity and accuracy a delay differential in each of individual branch received signals received by a plurality of antennas.

The present invention is a base station apparatus that has a radio receiving apparatus, and the radio receiving apparatus comprises, delay profile forming means that forms a delay profile for each of individual branch received signals received by a plurality of antennas, peak detection means that detects a peak in each delay profile signal formed by said delay profile forming means, and delay differential averaging processing means that obtains a maximum peak for each delay profile signal from among the peaks detected by said peak detection means and that obtains an average delay differential among individual delay profiles by averaging out a desired number of delay differentials between the maximum peaks.

With this configuration it is made possible to correct with simplicity and accuracy a delay differential between individual branch received signals received by a plurality of antennas.

The inter-branch delay differential detecting method according to the present invention is arranged such that, a delay profile is formed for each of individual branch received signals received by a plurality of antennas, a peak is detected in each of the formed delay profile signals, and a maximum peak in each delay profile signal is obtained from among the detected peaks, and an average delay differential between individual delay profiles is obtained by averaging out a desired number of delay differentials between the maximum peaks.

By this method it is made possible to detect with simplicity and accuracy a delay differential between individual signals between a plurality of antennas and baseband processing means.

The inter-branch delay differential detecting means according to the present invention is arranged such that, a delay profile signal with a leading phase from among individual delay profiles is delayed by an average delay differential among individual delay profiles, and the phases of individual profile signals are adjusted the same, and the delay profile signals of the same phase are combined.

Using this method it is made possible to correct an inter-branch delay differential with simplicity. It is also possible, since corrected delay profiles are combined, to obtain a combined delay profile that favorably reflects an actual path.

The inter-branch delay differential detecting means according to the present invention is arranged such that, a peak phase is detected from a combined delay profile signal obtained by combination processing, and a timing obtained by shifting a peak phase by an average delay differential under a corresponding branch is set a decoding timing for a branch received signal.

Using this method it is made possible to detect an adequate path that favorably reflects an actual path, since a peak phase is detected on the basis of a combined delay profile that favorably reflects an actual path. Moreover, since an adequately detected peak phase is shifted by an average delay differential and is set for a demodulating timing, it is made possible to operate demodulation function with accurate synchronization at the timing a path arrives.

The inter-branch delay differential detecting method according to the present invention is arranged such that, a branch received signal with a leading phase from among individual branch received signals is delayed by an average delay differential among individual delay profiles, and the phases of the individual branch received signals are adjusted the same.

Using this method it is made possible to correct with simplicity a delay differential in individual branch received signals received by a plurality of antennas.

As described above, using the radio receiving apparatus and inter-branch delay differential detecting method in the radio receiving apparatus, it is made possible to detect with simplicity and accuracy delay differentials that develop between received signals under individual branches in the course between a plurality of antennas and baseband processing means and to correct these delay differentials.

This application is based on the Japanese Patent Application NO. 2000-300916, filed on Sep. 29, 2000, entire contents of which are expressly incorporated by reference herein.

Industrial Applicability

The present invention is applicable to a radio receiving apparatus with a configuration in which received signals are demodulated, using the received signals obtained through a plurality of antennas, and a method for detecting a delay differential between branches in the apparatus.

What is claimed is:

1. A radio receiving apparatus comprising:
delay profile forming means that forms a delay profile for each of individual branch received signals received by a plurality of antennas,
peak detection means that detects a peak in each delay profile signal formed by said delay profile forming means, and
delay differential averaging processing means that obtains a maximum peak in each delay profile signal from among the peaks detected by said peak detection means and that obtains an average delay differential among individual delay profiles by averaging out a desired number of delay differentials between the maximum peaks.

2. The radio receiving apparatus according to claim 1, further comprising:
   delay means that delays a delay profile signal with a leading phase from among individual delay profiles by an average delay differential among the individual delay profiles, and adjusts the phases of individual profile signals the same, and
   profile combining means that combines the delay profile signals of the same phase.

3. The radio receiving apparatus according to claim 2, further comprising,
   path search means that detects a peak phase from a combined delay profile obtained by the combination by said profile combining means, and
   reception timing determining means that sets a timing obtained by shifting a peak phase by an average delay differential under a corresponding branch for a decoding timing for a branch received signal.

4. The radio receiving apparatus according to claim 3, wherein, when a branch received signal is a spread signal, said reception timing determining means sets a timing obtained by shifting a peak phase by an average delay differential under a corresponding branch for a dispreading timing for a branch received signal.

5. The radio receiving apparatus according to claim 1, wherein a range judged to be of the same path is defined at the time of a peak detection of a delay profile signal and the peak detection is performed within this range.

6. The radio receiving apparatus according to claim 1, wherein a delay differential is obtained through averaging processing using the upper peaks to Nth.

7. The radio receiving apparatus according to claim 1, further comprising:
   delay means that delays a branch received signal and
   switching means that switches delay and non-delay and outputs the switching to delay profile forming means,
   and wherein,
   when averaging processing of delay differentials is performed, a peak in a delay profile signal formed during a delay period, a phase differential with a corresponding peak in a delay profile signal under a different branch, and amplitude data of a peak in a delay profile signal formed during this delay period, and also a peak in a delay profile signal formed during a non-delay period, a phase differential with a corresponding peak in a delay profile signal under a different branch, and amplitude data of a peak in a delay profile signal formed during this non-delay period, are memorized, and
   a delay differential is obtained by employing a phase differential corresponding to one of the above two sets with larger amplitude data and performing averaging processing therewith.

8. A radio receiving apparatus comprising:
   delay profile forming means that forms a delay profile for each of individual branch received signals received by a plurality of antennas,
   delay differential detecting profile combining means that obtains a maximum peak in each delay profile signal from among the peaks in a delay profile signal formed by said delay profile forming means, that obtains an average delay differential among individual delay profiles by averaging out a desired number of delay differentials between the maximum peaks, and that delays a leading delay profile signal with a leading phase from among individual delay profile signals by an average delay differential among individual delay profiles and combines the phases of individual profile signals the same,
   path search means that detects a peak phase from a combined delay profile signal obtained by the combination in said delay differential detecting profile combining means,
   finger assign means that sets the peak phase a decoding timing for a branch received signal, and
   delay means that delays a leading delay profile signal from among individual branch received signals decoded by the decoding timing by an delay differential, and adjusts the phases of individual delay profile signals the same.

9. The radio receiving apparatus according to claim 8, further comprising:
   path search means that detects a peak phase from a combined delay profile obtained by the combination by said profile combining means, and
   finger assign means that sets the peak phase a decoding timing for an branch received signal.

10. A radio receiving apparatus comprising:
    delay means that delays each of branch received signals received by a plurality of antennas by a phase corresponding to each branch and adjusts individual branch received signals to the same phase,
    delay profile forming means that forms a delay profile for each of individual branch received signals output from said delay means, and
    delay differential detecting profile combining means that obtains a maximum peak for each delay profile signal from among the peaks in a delay profile signal formed by said delay profile forming means, and that obtains an average delay differential among individual delay profiles by averaging out a desired number of delay differentials between the maximum peaks and combines individual delay profile signals,
    said delay means, in accordance with delay differentials between delay profiles, delaying a branch received signal with a leading phase by an average delay differential and adjusting the phases of individual branch received signals the same.

11. A mobile station apparatus having a radio receiving apparatus, said radio receiving apparatus comprising:
    delay profile forming means that forms a delay profile for each of individual branch received signals received by a plurality of antennas,
    peak detection means that detects a peak in each delay profile signal formed by said delay profile forming means, and
    delay differential averaging processing means that obtains a maximum peak for each delay profile signal from among the peaks detected by said peak detection means and that obtains an average delay differential among individual delay profiles by averaging out a desired number of delay differentials between the maximum peaks.

12. A base station apparatus having a radio receiving apparatus, said radio receiving apparatus comprising:

delay profile forming means that forms a delay profile for each of individual branch received signals received by a plurality of antennas, peak detection means that detects a peak in each delay profile signal formed by said delay profile forming means, and delay differential averaging processing means that obtains a maximum peak for each delay profile signal from among the peaks detected by said peak detection means and that obtains an average delay differential among individual delay profiles by averaging out a desired number of delay differentials between the maximum peaks.

13. An inter-branch delay differential detecting method in a radio receiving apparatus, wherein, a delay profile is formed for each of individual branch received signals received by a plurality of antennas, a peak is detected in each of the formed delay profile signals, and a maximum peak in each delay profile signal is obtained from among the detected peaks, and an average delay differential between individual delay profiles is obtained by averaging out a desired number of delay differentials between the maximum peaks.

14. The inter-branch delay differential detecting method in a radio receiving apparatus according to claim 13, wherein, a delay profile signal with a leading phase from among individual delay profiles is delayed by an average delay differential among individual delay profiles, and the phases of individual profile signals are adjusted the same, and the delay profile signals of the same phase are combined.

15. The inter-branch delay differential detecting method in a radio receiving apparatus according to claim 14, wherein, a peak phase is detected from a combined delay profile signal obtained by combination processing, and a timing obtained by shifting a peak phase by an average delay differential under a corresponding branch is set a decoding timing for a branch received signal.

16. The inter-branch delay differential detecting method in a radio receiving apparatus according to claim 13, wherein, a branch received signal with a leading phase from among individual branch received signals is delayed by an average delay differential among individual delay profiles, and the phases of the individual branch received signals are adjusted the same.

\* \* \* \* \*